Jan. 6, 1970 E. A. KRUSCHKE 3,488,516

TRANSIENT ELIMINATION NETWORK

Filed Dec. 17, 1965

2 Sheets-Sheet 1

INVENTOR.
EUGENE A. KRUSCHKE
BY
Braddock & Burd
ATTORNEYS

TRANSIENT ELIMINATION NETWORK

Filed Dec. 17, 1965 2 Sheets-Sheet 2

INVENTOR.
EUGENE A. KRUSCHKE
BY
Braddock & Burd
ATTORNEYS

United States Patent Office 3,488,516

Patented Jan. 6, 1970

3,488,516

TRANSIENT ELIMINATION NETWORK

Eugene A. Kruschke, Minneapolis, Minn., assignor to Fabri-Tek Incorporated, Minneapolis, Minn., a corporation of Wisconsin Filed Dec. 17, 1965, Ser. No. 514,602

Int. Cl. H03k *17/16*

U.S. Cl. 307—244 1 Claim

ABSTRACT OF THE DISCLOSURE

In memory drive line selection apparatus in which a plurality of transistors are connected to a single drive line selection circuit, the improvement for eliminating transient turn on of an unselected transistor, having a diode connected between the source of the transient and the transistor electrode connected thereto and a resistor connected from a source of bias energy to a point between the diode and the electrode of the transistor.

This invention is concerned with data processing apparatus, and more particularly with networks for the elimination of transient turn-on of driver elements in memory addressing or selection circuits.

One of the presently used addressing or selecting methods in a memory of a data processing apparatus uses a transformer-diode matrix to drive the X lines and another such matrix to drive the Y lines. A plurality of transistors are used to make the selections within the matrix (see FIG. 1). A problem arising out of this type of circuit is the voltage transient turn-on of unselected transistors. The same problem arises in using a constant current type current driver for memory selection, when the cost of current determining resistors is reduced by connecting, for example, all the collectors of the driver transistors for one coordinate to a single current determining resistor. Prior art methods to overcome this problem have been aimed to keeping the unselected driver transistor inactive, by attempting to keep the voltage across the base and emitter of the driver transistors the same during the life of the voltage transient.

This invention overcomes the above problem by substantially eliminating the voltage transient with respect to the driver transistors.

Briefly described, this invention comprises the use of a diode connected intermediate the electrode of a current switching device, such as a transistor, which electrode is subjected to a voltage transient, and the source of the transient itself. Bias means are connected to one electrode of the diode to permanently back bias the diode with respect to the voltage transient. As a result, the voltage transient is not allowed to reach the current switching device. Also, the bias means is effective on the electrode of the transistor to keep it at a voltage level near that of the transient, to prevent adverse effects when the transient appears.

In the drawings:

In FIG. 2 the same numerals are used to denote identical circuit elements of FIG. 1, and in FIG. 4 the same numerals are used to denote identical circuit elements of FIG. 3.

Figure 1:
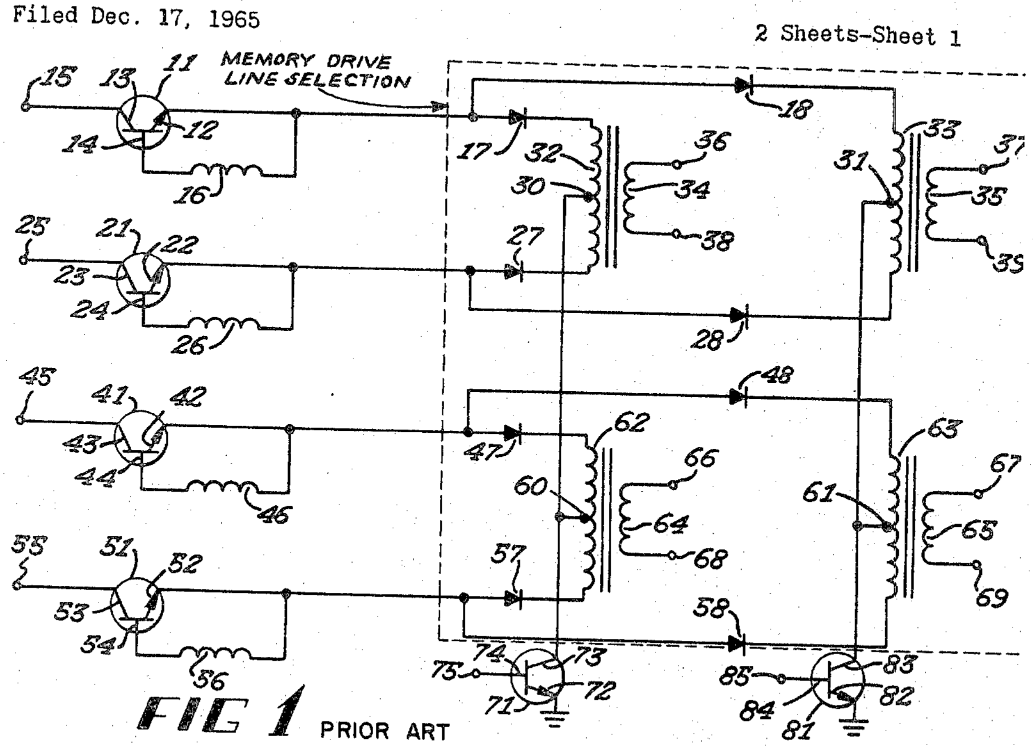
FIG 1 PRIOR ART
FIG. 1 is a schematic of a prior art circuit for selecting memory drive lines.

In FIG. 1 there are shown a pair of transistors 11 and 21, and another pair of transistors 41 and 51. Transistor 11 has an emitter 12, a collector 13 and a base 14. Transistor 21 has an emitter 22, a collector 23 and a base 24. Transistor 41 has an emitter 42, a collector 43 and a base 44. Transistor 51 has an emitter 52, a collector 53 and a base 54.

A terminal 15 is connected to collector 13 of transistor 11, and a terminal 25 is connected to collector 23 of transistor 21. Terminals 15 and 25 are adapted to be connected to a source of energy. A winding 16 is connected between emitter 12 and base 14 of transistor 11, and a winding 26 is connected between emitter 22 and base 24 of transistor 21. Windings 16 and 26 are adapted to receive signals to turn on, respectively, transistors 11 and 21.

There are also shown a pair of diodes 17 and 18 each having an anode connected to emitter 12 of transistor 11. A pair of diodes 27 and 28 are shown each having an anode connected to emitter 22 of transistor 21. A primary winding 32 is connected between the cathodes of diodes 17 and 27, and a primary winding 33 is connected between the cathodes of diodes 18 and 28. A secondary winding 34, associated with primary winding 32, is connected between a pair of terminals 36 and 38. A secondary winding 35, associated with primary winding 33, is connected between a pair of terminals 37 and 39. Terminals 36 and 38, and terminals 37 and 39, respectively, are adapted to be connected to memory drive lines.

A terminal 45 is connected to collector 43 of transistor 41, and a terminal 55 is connected to collector 53 of transistor 51. Terminals 45 and 55 are adapted to be connected to a source of power. A winding 46 is connected between emitter 42 and base 44 of transistor 41, and a winding 56 is connected between emitter 52 and base 54 of transistor 51. Windings 46 and 56 are adapted to receive signals for the turn-on, respectively, of transistors 41 and 51.

There are also shown a pair of diodes 47 and 48 each having an anode connected to emitter 42 of transistor 41. A pair of diodes 57 and 58 are shown each having an anode connected to emitter 52 of transistor 51. A primary winding 62 is connected between the cathodes of diodes 47 and 57, and a primary winding 63 is connected between the cathodes of diodes 48 and 58. A secondary winding 64, associated with primary winding 62, is connected between a pair of terminals 66 and 68. A secondary winding 65, associated with primary winding 63, is connected between a pair of terminals 67 and 69. Terminals 66 and 68, and terminals 67 and 69, respectively, are adapted to be connected to memory drive lines.

There is also shown a pair of transistors 71 and 81. Transistor 71 has an emitter 72, a collector 73 and a base 74. Transistor 81 has an emitter 82, a collector 83 and a base 84. Emitters 72 and 82 are connected to a common ground. A terminal 75 is connected to base 74 of transistor 71, and a terminal 85 is connected to base 84 of transistor 81. Terminals 75 and 85 are adapted to receive signals for the turn-on, respectively, of transistors 71 and 81. Collector 73 of transistor 71 is connected to a center-tap 30 on primary windings 32 and a center-tap 60 on primary winding 62. Collector 83 of transistor 81 is connected to a center-tap 31 on primary winding 33 and to a center-tap 61 on primary winding 63.

Figure 2:
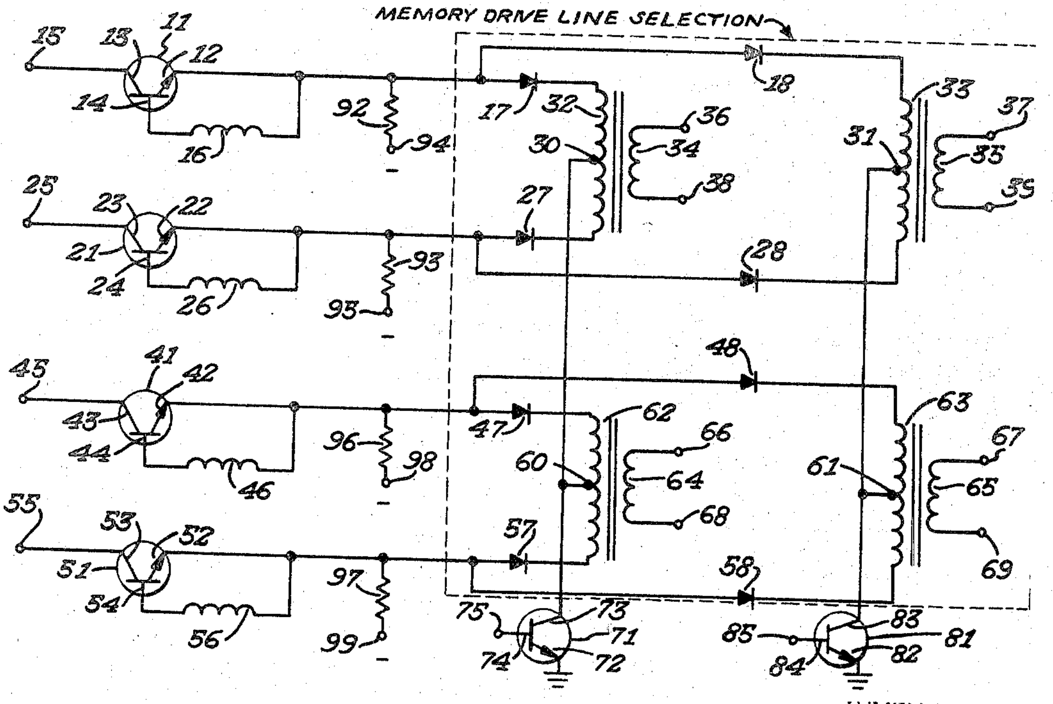
FIG. 2 is the schematic of the circuit of FIG. 1 including additional circuit elements of this invention.

In FIG. 2 there is shown the complete circuit of FIG. 1, including the following circuit elements. A resistor 92 is connected between a terminal 94 and the anodes of diodes 17 and 18. A resistor 93 is connected between a terminal 95 and the anodes of diodes 27 and 28. A resistor 96 is connected between a terminal 98 and the anodes of diodes 47 and 48. A resistor 97 is connected between a terminal 99 and the anodes of diodes 57 and 58. Terminals 94, 95, 98 and 99 are each adapted to be connected to a negative source of bias energy.

In both FIGS. 1 and 2, the portion of the schematics which comprises the memory drive line selection circuitry is shown enclosed in dashed lines.

Figure 3:
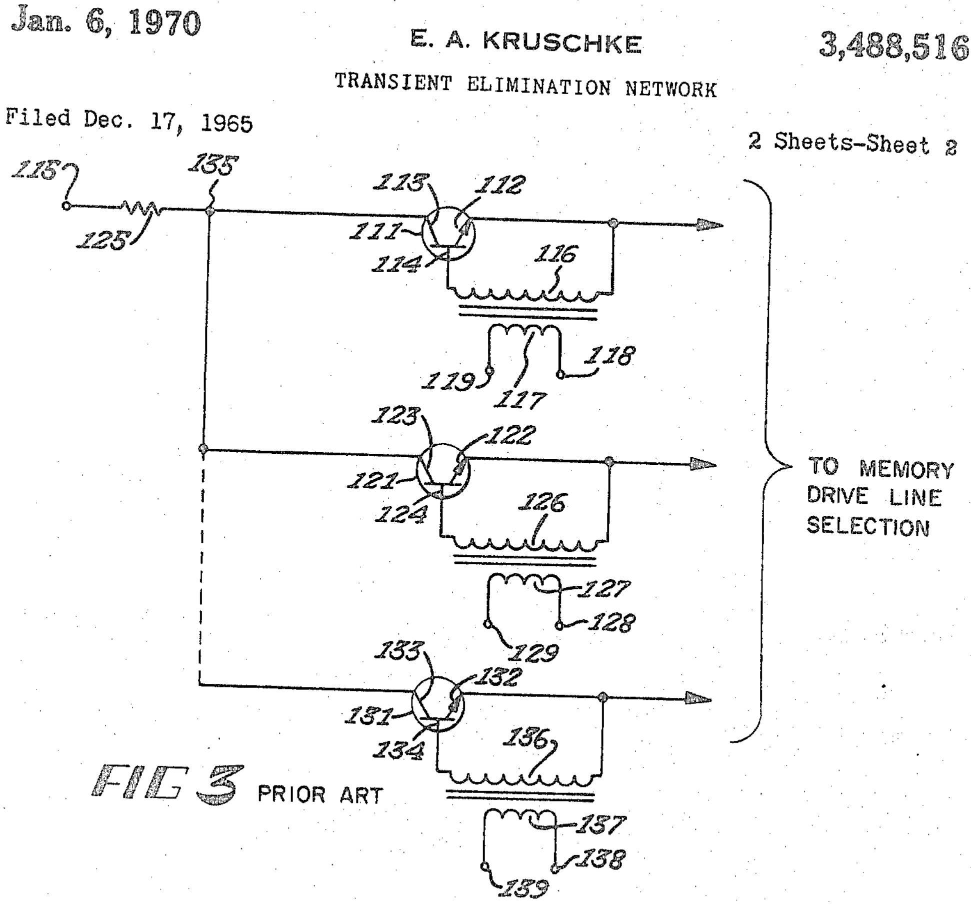
FIG. 3 is another schematic of a prior art circuit for selecting memory drive lines.

In FIG. 3 there are shown three transistors 111, 121, and 131. Transistor 111 has an emitter 112, a collector 113 and a base 114. Transistor 121 has an emitter 122, a collector 123 and a base 124. Transistor 131 has an emitter 132, a collector 133 and a base 134.

There is also shown a terminal 115 adapted to be connected to a source of energy. A resistor 125 is connected between terminal 115 and a junction 135. Junction 135 is connected to collector 113 of transistor 111, collector 123 of transistor 121, and collector 133 of transistor 131. The dotted line between junction 135 and collector 133 is intended to indicate that a number of other transistors could be connected in the same manner as those shown in the circuit of FIG. 3.

A secondary winding 116 is connected between emitter 112 and base 114 of transistor 111. A primary winding 117, associated with secondary winding 116, is connected between a pair of terminals 118 and 119. Terminals 118 and 119 are adapted to receive a signal for the turn-on of transistor 111. A secondary winding 126 is connected between emitter 122 and base 124 of transistor 121. A primary winding 127, associated with secondary winding 126, is connected between a pair of terminals 128 and 129. Terminals 128 and 129 are adapted to receive a signal for the turn-on of transistor 121. A secondary winding 136 is connected between emitter 132 and base 134 of transistor 131. A primary winding 137, associated with secondary winding 136, is connected between a pair of terminals 138 and 139. Terminals 138 and 139 are adapted to receive a signal for the turn-on of transistor 131. Emitters 112, 122 and 132 are adapted to be connected to memory drive line selection means.

Figure 4:
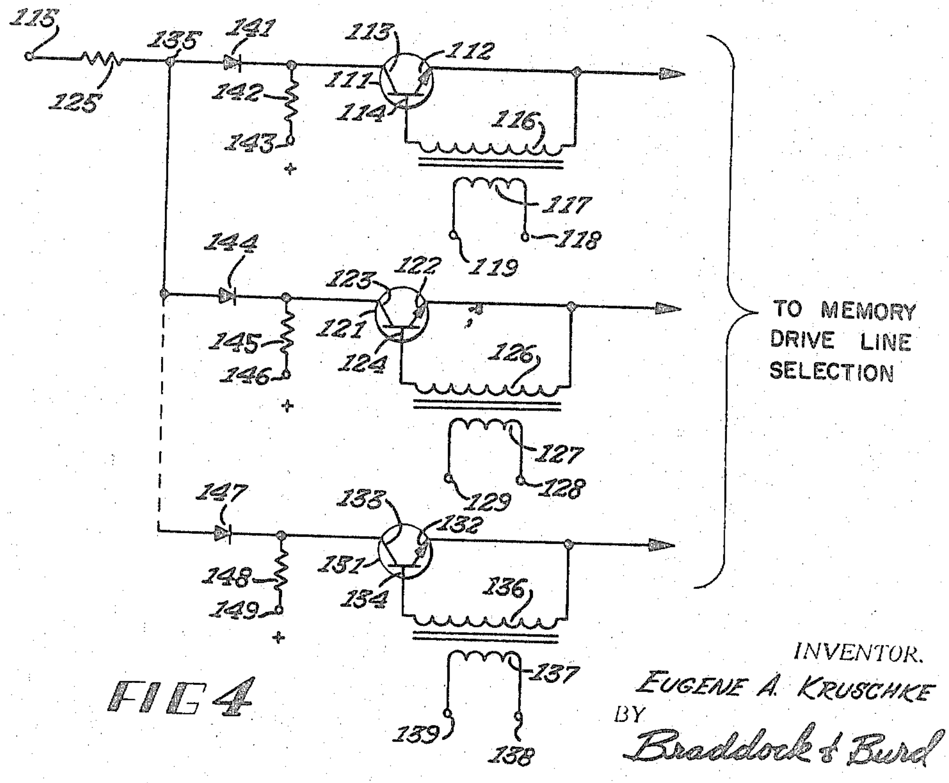
FIG. 4 is the schematic of FIG. 3 including circuit elements of this invention.

In FIG. 4 the same numerals are used to denote the same circuit elements of FIG. 3. In addition the following circuit elements are added. A diode 141 is shown having an anode connected to junction 135 and a cathode connected to collector 113 of transistor 111. A diode 144 is shown having an anode connected to junction 135 and a cathode connected to collector 123 of transistor 121. A diode 147 is shown having an anode connected to junction 135 and a cathode connected to collector 133 of transistor 131.

A resistor 142 is connected between a terminal 143 and the cathode of diode 141. A resistor 145 is connected between a terminal 146 and the cathode of diode 144. A resistor 148 is connected between a terminal 149 and the cathode of diode 147. Terminals 143, 146 and 149 are adapted to be connected to a positive source of bias energy.

For better understanding of the operation of the circuit of FIG. 1, it should first be understood that transistors 11 and 41 are "read" transistors, and transistors 21 and 51 are "write" transistors. Transistors 71 and 81 are selector transistors. In normal operation of such a transformer diode matrix, an address is decoded in the data processing apparatus associated with the matrix, and then provides an input to the selected read or write transistor as well as the appropriate selector transistor.

Assume first that the decoded address is such as to provide signals to transistors 11 and 71. A signal appearing at input terminal 75 would be felt on base 74 of transistor 71, tending to bias transistor 71 on. A concurrent signal felt across winding 16 would in turn be felt at base 14 of transistor 11 to allow a current flow from terminal 15, through collector 13 and emitter 12, diode 17, the upper half of winding 32, and center-tap 30, from collector 73 to emitter 72 and to ground. No current would flow through diode 18 and winding 33 as selector transistor 81 has not been biased on.

In essence, the turn-on of transistors 11 and 71 causes the positive voltage available at terminal 15 to be felt at the upper end of winding 32. As winding 32 is center-tapped, a negative voltage will appear at the lower end of winding 32. This negative voltage forward biases diode 27 causing emitter 22 of transistor 21 to go strongly negative. When this occurs, transistor 21 tends to turn-on.

To overcome this problem, the components of FIG. 2 have been added to the prior art circuit of FIG. 1. The elimination of the negative transient on emitter of transistor 21, as described above, is achieved by connecting the anode of diode 27 through a resistor 93 to a terminal 95 at which is available a source of negative bias energy. This has the effects of back biasing diode 27 to prevent transient changes from passing to emitter 22, and also holds emitter 22 at the negative voltage level at all times when transistor 21 is not activated to prevent a tendency for transistor 21 to turn-on following a sudden negative voltage appearing at emitter 22.

Though the above description was for the purposes of illustration made relative only to the turn-on of transistors 11 and 71, it is apparent that the same or similar transients are caused by the selection of any address. For example, the turn-on of transistor 81 and 51 will cause a positive voltage to be felt at the lower end of winding 63, which in turn will cause a negative voltage to be felt at the upper end of winding 63 that would be felt at emitter 42 and tend to turn on transistor 41 in the absence of the negative bias connected through resistor 96 to the anode of diode 48.

The circuit of FIG. 3 also concerns a plurality of current switching devices, here shown as transistors 111, 122 and 132. In operation, terminal 115 is connected to a source of positive voltage. The application of a selection signal across terminals 118 and 119, for example, will cause the signal to be transferred from primary winding 117 to secondary winding 116, and thus bias on transistor 111. A current will then flow from terminal 115, through current determining resistor 125, from collector 113 to emitter 112 of transistor 111, and then on to the memory drive lines selection circuitry. A difficulty arising out of the circuit shown in FIG. 3, which uses one current determining resistor 125 for a plurality of driving transistors, is the voltage transient which is felt on the collectors of all transistors when any one is activated. For example, when transistor 111 is turned on, as described above, the voltage at junction 135 (which is the voltage felt on the collectors of all transistors) is changed; generally it is brought to near ground. This change in voltage on the unactivated transistor collectors tends to turn them on.

To overcome this problem the components shown in FIG. 4 are added to the circuit of FIG. 3. That is, diodes 141, 144 and 147 are placed between junction 135 and the respective collectors 113, 123 and 133. In addition resistors 142, 145 and 148 are placed, respectively, between the cathodes of diodes 41, 144 and 147 and a source of positive bias energy. Now then one of the driver transistors is activated, such as transistor 111 as described above, and junction 135 is changed to near ground, diodes 144 and 147 become back biased to prevent the voltage transient from reaching collectors 123 and 133.

It is thus apparent that the novel circuitry of this invention substantially eliminates voltage transients which were previously a problem in memory selection circuit driver transistors.

It is apparent that though this invention has been described with reference to two specific embodiments, the principles involved in this invention may be applied to other embodiments as well.

The embodiments of the invention in which an exclusive property or privilege is claimed are defined as follows:

1. In a memory selection circuit for data processing apparatus, the circuit including a plurality of X coordinate drive lines and a plurality of Y coordinate drive lines, drive circuit means connected to the drive lines, and means for selecting drive lines connected to the drive circuit means, the improvement for preventing transient turn-on of unselected drive circuit means comprising:

the drive circuit means including a plurality of transistors each having emitter, collector and base electrodes;

means connecting each of said emitter electrodes to a pre-determined one of the drive lines;

a source of energy;

a plurality of diodes each connected between said source of energy and a respective one of said collector electrodes, said diodes poled to permit current flow through said source of energy and said transistors;

a source of bias energy; and a plurality of resistors each connected between said source of bias energy and a respective one of said collector electrodes for back biasing said diodes when the respective transistor is off.

References Cited

UNITED STATES PATENTS

| | | | |
|---|---|---|---|
| 2,840,726 | 6/1958 | Hamilton | 307—270 |
| 3,054,950 | 9/1962 | Lee | 307—270 |
| 3,119,025 | 1/1964 | Lourie et al. | 307—270 |
| 3,146,438 | 8/1964 | Peterson et al. | 307—243 |
| 3,158,692 | 11/1964 | Gerkensmeier | 307—244 |
| 3,228,002 | 1/1966 | Reimes | 307—243 |

JOHN S. HEYMAN, Primary Examiner

H. A. DIXON, Assistant Examiner

U.S. Cl. X.R,

307—88, 243